(12) United States Patent
Boursier

(10) Patent No.: US 8,864,070 B2
(45) Date of Patent: Oct. 21, 2014

(54) MACHINABLE COMPOSITE MATERIAL

(75) Inventor: Bruno Boursier, Dublin, CA (US)

(73) Assignee: Hexcel Corporation, Dublin, CA (US)

( * ) Notice: Subject to any disclaimer, the term of this patent is extended or adjusted under 35 U.S.C. 154(b) by 686 days.

(21) Appl. No.: 13/222,261

(22) Filed: Aug. 31, 2011

(65) Prior Publication Data

US 2012/0040169 A1 Feb. 16, 2012

Related U.S. Application Data

(62) Division of application No. 12/856,210, filed on Aug. 13, 2010, now abandoned.

(51) Int. Cl.

| | |
|---|---|
| *B64C 1/20* | (2006.01) |
| *B32B 5/28* | (2006.01) |
| *B29C 70/68* | (2006.01) |
| *B32B 27/04* | (2006.01) |
| *B32B 5/02* | (2006.01) |
| *B32B 5/26* | (2006.01) |
| *C08J 5/24* | (2006.01) |
| *C08J 5/04* | (2006.01) |
| *B29C 70/54* | (2006.01) |
| *B64F 5/00* | (2006.01) |

(52) U.S. Cl.
CPC ... *C08J 5/24* (2013.01); *B32B 5/28* (2013.01); *B29C 70/68* (2013.01); *Y02T 50/433* (2013.01); *B32B 27/04* (2013.01); *B32B 5/022* (2013.01); *B32B 5/26* (2013.01); *C08J 5/04* (2013.01); *B29C 70/545* (2013.01); *Y02T 50/43* (2013.01); *B32B 2605/18* (2013.01); *B64F 5/0009* (2013.01); *B32B 5/024* (2013.01)

USPC ............... 244/118.1; 428/295.1; 428/297.1; 428/298.1; 428/300.7

(58) Field of Classification Search
USPC ............. 244/118.1, 117 R; 428/297.1, 289.1, 428/300.7, 295.1
See application file for complete search history.

(56) References Cited

U.S. PATENT DOCUMENTS

| | | | |
|---|---|---|---|
| 4,136,846 | A | 1/1979 | Brault |
| 6,206,067 | B1 | 3/2001 | Kociemba et al. |
| 6,468,372 | B2 | 10/2002 | Kociemba et al. |

(Continued)

FOREIGN PATENT DOCUMENTS

| | | |
|---|---|---|
| DE | 19716057 | 10/1998 |
| EP | 1125728 | 8/2001 |

(Continued)

OTHER PUBLICATIONS

PCT/US2011/45130—Search Report—Sep. 29, 2011.

*Primary Examiner* — N. Edwards
(74) *Attorney, Agent, or Firm* — W. Mark Bielawski; David J. Oldenkamp

(57) ABSTRACT

An assembly that includes a first part composed of a fibrous structure that includes fibers and a cured resin matrix. The fibrous structure has at least one surface and a layer that is located on the surface. The layer includes a discontinuous fiber composite that is composed of randomly oriented short fibers and a cured resin matrix wherein the layer has been machined to provide a machined surface. The assembly also includes a second part that is attached to the first part. The second part includes at least one surface that fits against the machined surface on the first part.

12 Claims, 6 Drawing Sheets

(56) References Cited

U.S. PATENT DOCUMENTS

| | | | |
|---|---|---|---|
| 6,924,021 B1 | 8/2005 | Colegrove et al. | |
| 7,141,191 B2 | 11/2006 | Engwall et al. | |
| 7,510,390 B2 | 3/2009 | Callis | |
| 7,854,209 B2 * | 12/2010 | Yamasaki | 112/444 |
| 7,914,223 B2 | 3/2011 | Wood et al. | |
| 7,960,674 B2 * | 6/2011 | Boursier et al. | 219/633 |
| 2008/0169380 A1 | 7/2008 | Jackson et al. | |
| 2009/0095206 A1 * | 4/2009 | Dacus | 108/57.27 |
| 2011/0011975 A1 * | 1/2011 | Boursier et al. | 244/118.1 |
| 2011/0247958 A1 * | 10/2011 | Lucas et al. | 206/524.6 |
| 2012/0034070 A1 * | 2/2012 | Bleicken | 415/129 |
| 2012/0040169 A1 * | 2/2012 | Boursier | 428/223 |
| 2012/0201683 A1 * | 8/2012 | Stamps et al. | 416/204 R |
| 2012/0223183 A1 * | 9/2012 | Boursier et al. | 244/118.1 |
| 2014/0163139 A1 * | 6/2014 | Wang et al. | 523/435 |

FOREIGN PATENT DOCUMENTS

| | | |
|---|---|---|
| EP | 1134314 | 9/2004 |
| EP | 0916477 | 12/2004 |
| JP | 1281930 | 11/1989 |

* cited by examiner

MACHINABLE COMPOSITE MATERIAL

This application is a divisional of U.S. patent application Ser. No. 12/856,210, which was filed on Aug. 13, 2010.

BACKGROUND OF THE INVENTION

1. Field of the Invention

The present invention relates generally to molded composite materials. More particularly, the present invention is directed to molded composite materials that are suitable for structural applications and which can be machined accurately to provide precise fitting of parts together or other benefits.

2. Description of Related Art

Composite materials typically include fibers and a resin matrix as the two principal components. Composite materials typically have a rather high strength to weight ratio. As a result, composite materials are being used in demanding environments, such as in the field of aerospace where the high strength and relatively light weight of composite parts are of particular importance.

Compression molding of thermosetting or thermoplastic composite materials is often used to produce parts that connect major structures together. For example, molded composite materials have been used as fittings, gussets, clips, cleats and intercostals that connect major structural parts of an airplane together. The molded composite connector must mate precisely with the various structures, such as fuselage parts, wing skins, frames, stiffeners and spars, which are being connected together.

Metal parts have been used in the past to connect aircraft structures together. An advantage of using metal connectors is that they can be machined to precisely match the geometry of the mating parts as well as meet the tolerances required for proper assembly. In many instances, the same structural assembly is repeated many times, but each instance has a unique geometry, because of the aerodynamic shapes of wings and fuselages. Fuselage and wing cross-sections are not constant. For example, wings taper from the wing root (near the fuselage) to the wing tip. Fuselage cross-sections are reduced toward the nose and tail of the airplane. The skin stiffening structures for the fuselage and wing are made of an assembly of regularly spaced circumferential frames and regularly spaced longitudinal stringers. The geometry of the connectors that are used to tie the frames and stringers to the skin vary slightly from one location to the next due to the non-constant cross-section of the wing or fuselage skins. It is an expensive proposition to make a different mold for each particular connector at a given location. It would be desirable to mold a single part that could then be machined to provide a number of different parts that have the required variations in part geometry. A single mold could be used to produce multiple parts with slightly different geometries, for example to accommodate the slight change of geometry of a fuselage skin from one frame location to the next, instead of the current practice which is limited to producing a single part geometry per mold.

It is very difficult to produce molded composite parts that have tolerances which are as tight as the tolerances that can be obtained with a machined metal part. In addition, a molded composite part cannot be remolded to meet the changes in dimensions that occur due to variables in the assembly process. As a result, shims are typically used to correct the dimensional mismatches that may occur when molded composite parts are used to connect structures together.

It is difficult to machine composite parts without creating structural damage. The fibers tend to be disrupted and delamination can occur which greatly reduces the strength of the part. Composite parts that contain unidirectional (UD) fibers are commonly used in many structural parts. Composite parts that contain UD fibers are particularly difficult to machine without adversely affecting the strength of the part. Accordingly, machining of such structural composite parts has been avoided It would be desirable to provide composite parts that can be used in structural applications and which can be manufactured to precise initial dimensions. In addition, the dimensions of the structural composite part should be amenable to alteration at a later time, if needed, to ensure that the part fits properly without the need for shimming.

SUMMARY OF THE INVENTION

In accordance with the present invention, composite material is provided that can be machined in the same manner as metal to produce composite parts that have precise dimensions. The composite material can be machined as part of the initial fabrication process to provide composite parts having precise surface dimensions. The composite part can also be further machined to meet dimensional variations that may occur during the assembly process or which may be necessary due to belated design changes that may affect the dimensions of the part.

The composite material in accordance with the present invention is designed to be machined to provide a composite part that has at least one machined surface. The composite material is composed of a fibrous structure made up of fiber and a resin matrix. As a feature of the invention, a machinable layer is located on at least one of the surfaces of the fibrous structure. The machinable layer is composed of random discontinuous fiber composite. A portion of the machinable layer is removed to provide a composite part having the desired final machined surface. The machinable layer is made sufficiently thick to allow machining to be accomplished without penetrating into the fibrous structure. This ensures that the structural integrity of the part is not compromised during the machining process.

As another feature of the invention, the composite material is machined to provide a composite part having at least one machined dimension. In these situations, the fibrous structure has at least two surfaces that are separated by a distance or dimension. The machinable layer is located on at least one of the two surfaces so as to increase or reduce the initial dimension of the fibrous structure to provide a pre-machined dimension. The machinable layer(s) are made sufficiently thick such that the difference between the fibrous support surface dimension and the pre-machined dimension is greater than the difference between the fibrous support surface dimension and the desired machined dimension. In addition, the difference between the fibrous support surface dimension and the machined dimension is greater than zero. This ensures that the fibrous support is not penetrated during machining of the composite material to form the composite part The combination of fibrous structure and machinable layer in accordance with the present invention provides structural parts having the beneficial high strength to weight ratio of composite material while at the same time rendering the part amenable to machining to precise dimensions in the same manner as metal parts. These beneficial features make the parts well-suited for use in aircraft primary structures and other structural applications. It was discovered that the machinable layers could be formed on the surfaces of the fibrous structure and machined without adversely affecting the strength of the resulting part.

Structural parts in accordance with the present invention may include fibrous structures and machinable layers that are composed of the same material provided that the properties of the material are sufficient to meet the structural requirements for the structural part.

The present invention is also directed to methods for making uncured composite material which can be molded and then machined to provide composite parts having at least one machined surface and/or machined dimension. The invention also covers methods for curing the uncured composite material. In addition, the invention covers methods for machining the cured composite material both during the initial fabrication of the part and during the assembly process where machining of the composite part may be required to fit the part properly to other structures. Methods for making a group of machined parts, which have a range of geometries, from a group of molded parts that have the same geometry, are also covered by the present invention.

The above described and many other features and attendant advantages of the present invention will become better understood by reference to the following detailed description when taken in conjunction with the accompanying drawings.

DETAILED DESCRIPTION

The machinable composite materials in accordance with the present invention may be used for any intended purpose. However, they are preferably used in aerospace vehicles and particularly preferred for use in commercial and military aircrafts. For example, the machinable composite materials may be used to make non-primary (secondary) aircraft structures. However, the preferred use of the machinable composite material is for structural applications, such as connecting primary aircraft structures together. Primary aircraft structures or parts are those elements of either fixed-wing or rotary wing aircraft that undergo significant stress during flight and which are essential for the aircraft to maintain controlled flight. The machinable composite materials may also be used for other structural applications to make load-bearing parts and structures in general.

Figure 5:
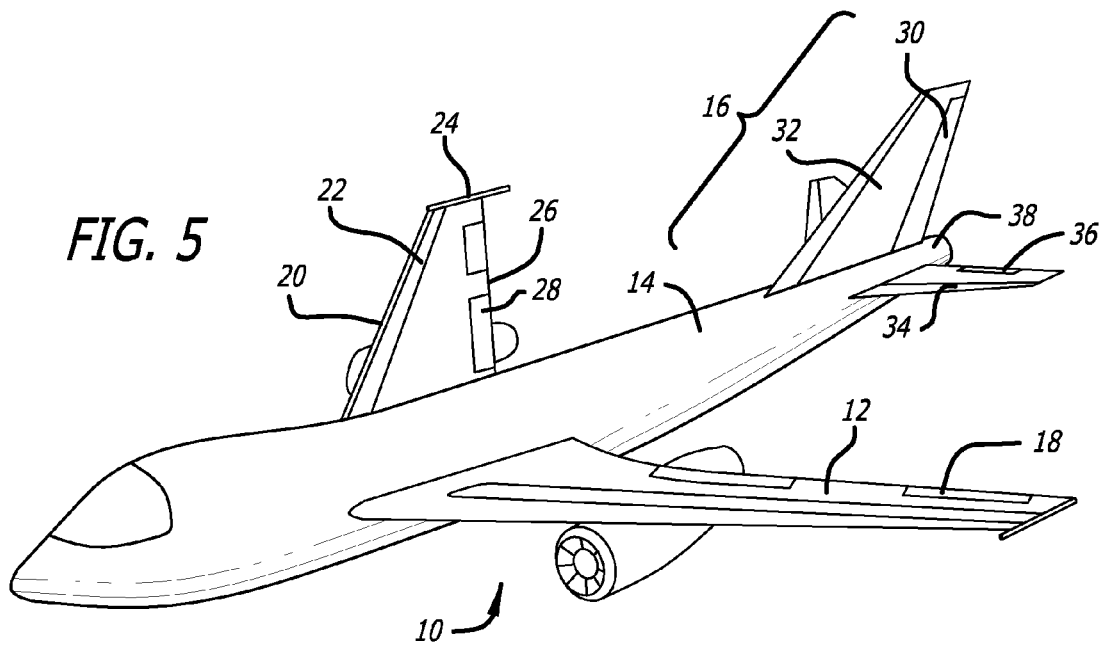
FIG. 5 is a simplified view of an aircraft showing the structural areas of the aircraft where machined composite parts in accordance with the present invention may be used.

FIG. 5 depicts a fixed-wing aircraft at 10 that includes a number of exemplary primary aircraft structures and parts that may include machinable composite materials in accordance with the present invention as either part of the structure or as a connecting element. The exemplary primary parts or structures include the wing 12, fuselage 14 and tail assembly 16. The wing 12 includes a number of exemplary primary aircraft parts, such as ailerons 18, leading edge 20, wing slats 22, spoilers 24 trailing edge 26 and trailing edge flaps 28. The tail assembly 16 also includes a number of exemplary primary parts, such as rudder 30, fin 32, horizontal stabilizer 34, elevators 36 and tail 38. The machinable composite materials may be used to form all or part of these structures as well as other exemplary primary aircraft structures such as wing spars. The machinable composite materials are particularly preferred for use in making the various flanges, clips, cleats, gussets, shear ties, brackets, intercostals, links, lugs, fittings and other connectors that connect primary parts together to form primary aircraft structures.

Figure 4:
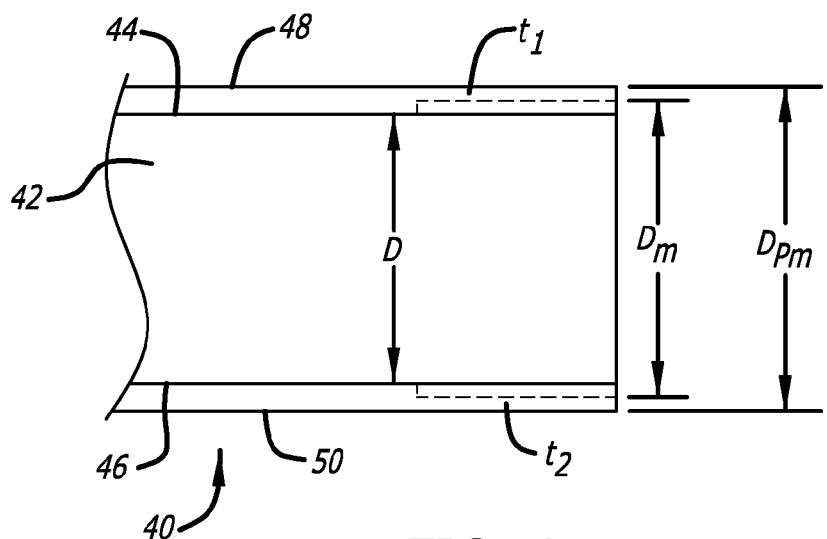
FIG. 4 is a simplified side sectional view showing exemplary composite material in accordance with the present invention where machinable layers are present which increase the dimension between the surfaces of the fibrous structure to a pre-machined dimension that is greater than the machined dimension.

A preferred exemplary machinable composite material is shown at 40 in FIG. 4. The composite material 40 includes a fibrous structure 42 which is composed of fibers and a resin matrix. The fibrous structure 42 has surfaces 44 and 46 that have a dimension D between them. The composite material 40 is adapted or designed to be machined to provide composite part having a machined dimension $D_M$ that is greater than dimension D. Machinable layers 48 and 50 are provided on both surfaces of the fibrous structure. The machinable layers 48 and 50 are composed of quasi-isotropic chopped prepreg. The machinable layers 48 and 50 have thicknesses $t_1$ and $t_2$, respectively. The two machinable layers 48 and 50 increase the dimension D to a pre-machined dimension $D_{PM}$ that is greater than the intended machined dimension $D_M$. One or both of the machinable layers 48 and 50 are machined to remove sufficient material to reduce $D_{PM}$ to the desired $D_M$.

As a feature of the invention, the two machinable layers are sufficiently thick so that machining of the composite material to achieve the desired $D_M$ is accomplished without penetrating into the fibrous structure 42.

In determining how thick the machinable layer(s) must be, it is necessary to establish what the various dimensions D, $D_M$ and $D_{PM}$ will be for the composite material and composite part. In order to insure that the fibrous structure is not penetrated during machining, it is necessary that the difference between D and $D_M$ over the surface(s) to be machined is not zero and that the differences between D and $D_{PM}$ over the surface(s) to be machined are greater than the differences between D and $D_M$. The difference between D and $D_M$ is equal to the thickness of the machinable layer(s) after machining is complete ($MLT_M$) and the difference between D and $D_{PM}$ is equal to the thickness of the machinable layer(s) before machining ($MLT_M$). $MLT_{PM}$ is equal to $t_1+t_2$ in FIG. 4.

For most structural applications, the difference between D and $D_{PM}$ should be from 0.05 to 40 millimeters greater than the difference between D and $D_M$. For aircraft primary structure application, it is preferred that the difference between D and $D_{PM}$ is from 0.1 to 20 millimeters greater than the difference between D and $D_M$. The ratio of $MLT_{PM}$ to $MLT_M$ should be in a range from 1:1 to 50:1. Preferably, the ratio of $MLT_{PM}$ to $MLT_M$ will be from 2:1 to 20:1. In addition, the difference between D and DM should be at least 0.1 mm (0.05 mm per side) to insure that the fibrous layer is not penetrated and that a sufficient amount of machinable layer ($MLT_M$) remains that the machined surface and fibrous structure will not delaminate or otherwise lose their structural integrity. The $MLT_M$ may range from be from 0.1 mm (0.5 mm per side) to 40 mm (20 mm per side) depending upon the amount and degree of machining that a particular part may be subjected to.

Composite material 40 in FIG. 4 is shown with both surfaces of the fibrous structure covered with a machinable layer. This is the preferred embodiment when the composite material is being machined to provide a composite part with a machined dimension $D_M$. In some instances, the dimension of the composite part may not be critical, but it still may be desired, or necessary, to provide a precisely machined surface on one side of the composite material. For example, the surface of the composite material may require machining where the surface of the composite part must match precisely the surface of a corresponding part. The machined surface may be flat or have various surface contours. In these situations, it is preferred that only the surface to be machined is covered with a machinable layer. The machinable layer can be machined during initial fabrication when the desired final surface configuration is known. In addition, the machinable layer may be machined as part of the assembly process where the surface must be machined to match the surface configuration of a matching part that is not established precisely until assembly is undertaken.

When the composite material is being machined to provide a composite part with a machined surface only, and not a machined dimension, the machinable layer must also meet certain requirements with respect to the thickness of the machinable layer both before and after machining. The machinable layer should be sufficiently thick so that the entire surface configuration can be machined into the machinable layer without penetrating the underlying fibrous support. The thickness of the machinable layer should be kept in a range of from 1 mm to 20 mm in order to provide the desired benefits of machinability and structural strength. Accordingly, the depth of machining will be limited within this range. The entire machinable layer may be removed in places, if desired, provided that there is no penetration into the underlying fibrous support. In order to avoid inadvertent penetration into the fibrous support, it is preferred that the minimum thickness of the machinable layer remaining after machining should be at least 0.05 mm and preferably at least 0.1 mm.

Figure 6:
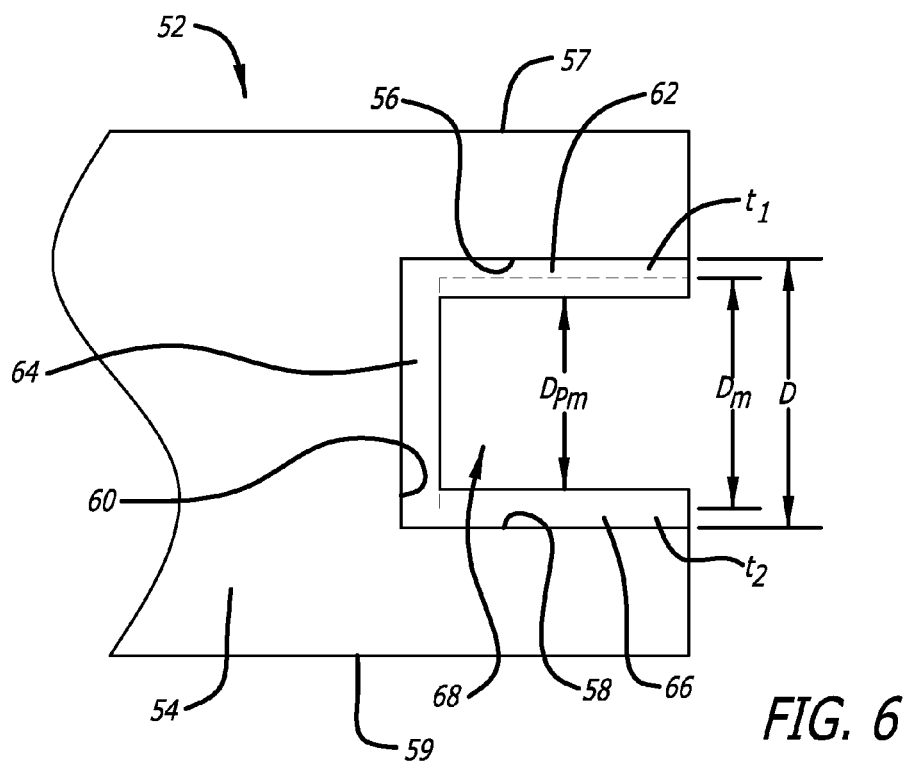
FIG. 6 is a simplified side sectional view showing exemplary composite material in accordance with the present invention where machinable layers are present which decrease the dimension between the surfaces of the fibrous structure to a pre-machined dimension that is less than the machined dimension.

An alternate preferred exemplary machinable composite material is shown at 52 in FIG. 6. The composite material 40 includes a fibrous structure 54 which is composed of fibers and a resin matrix. The fibrous structure 54 has surfaces 56, 58 and 60. Surfaces 56 and 58 have a dimension D between them. The composite material 52 is adapted or designed to be machined to provide a composite part having a machined dimension $D_M$ that is less than dimension D. Machinable layers 62, 64 and 66 are provided on all three surfaces of the fibrous structure. The machinable layers are composed of random discontinuous fiber composite. The machinable layers 62 and 66 have thicknesses $t_1$ and $t_2$, respectively. The two machinable layers 62 and 66 decrease the dimension D to a pre-machined dimension $D_{PM}$ that is less than the intended machined dimension D. One or both of the machinable layers 62 and 66 are machined to remove sufficient material to increase $D_{PM}$ to the desired $D_M$. The thicknesses of the two machinable layers are determined following the same guidelines set forth above. The layers are sufficiently thick so that machining of the composite material to achieve the desired $D_M$ is accomplished without penetrating into the fibrous structure 54.

Machinable layer 64 may be machined at the same time as layers 62 and 66 to provide a precise depth for opening 68 or if a precise surface configuration is required. Alternatively, machinable layer 64 may be machined later to accommodate variations in the assembly process. For example, the depth of opening 68 may need to be increased or otherwise machined in order to match a corresponding part that is inserted into opening 68 as part of an assembly process. When machined as part of the assembly process, the machinable layer 64 must be thick enough to allow machining of the layer to meet expected variations in the depth of opening 68 without penetrating into the fibrous structure 54.

Figure 1:
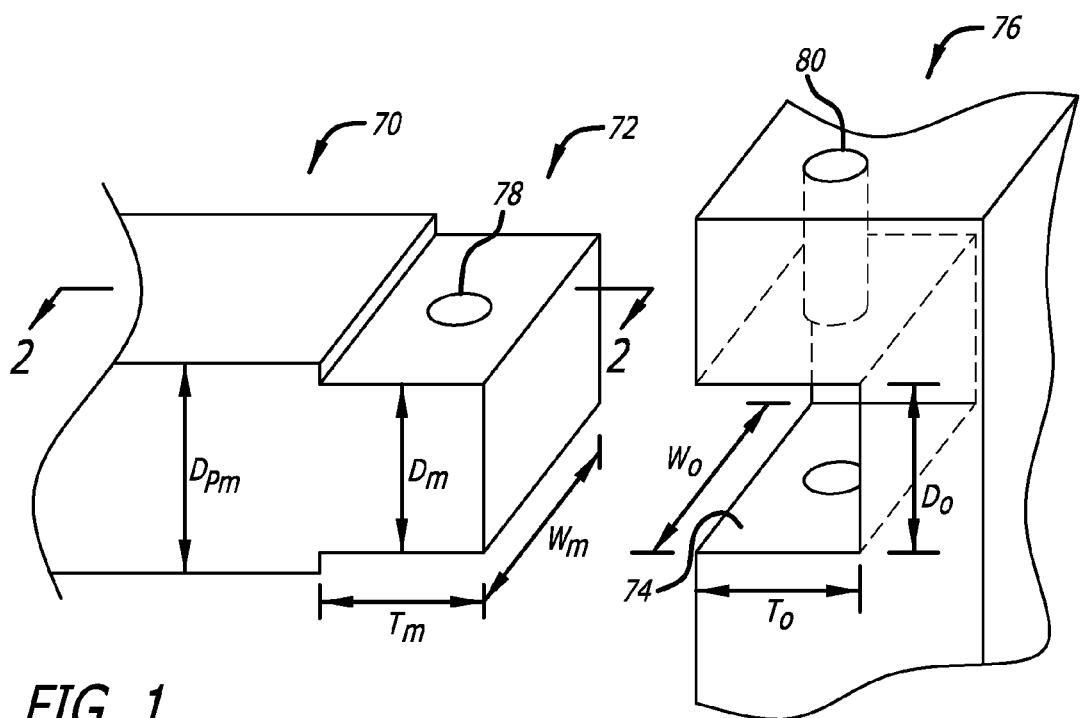
FIG. 1 shows composite material in accordance with the present invention that has been machined on two sides to form a composite part. The machined composite part is shown prior to its being inserted into a matching opening in an aircraft primary structure.
Figure 2:
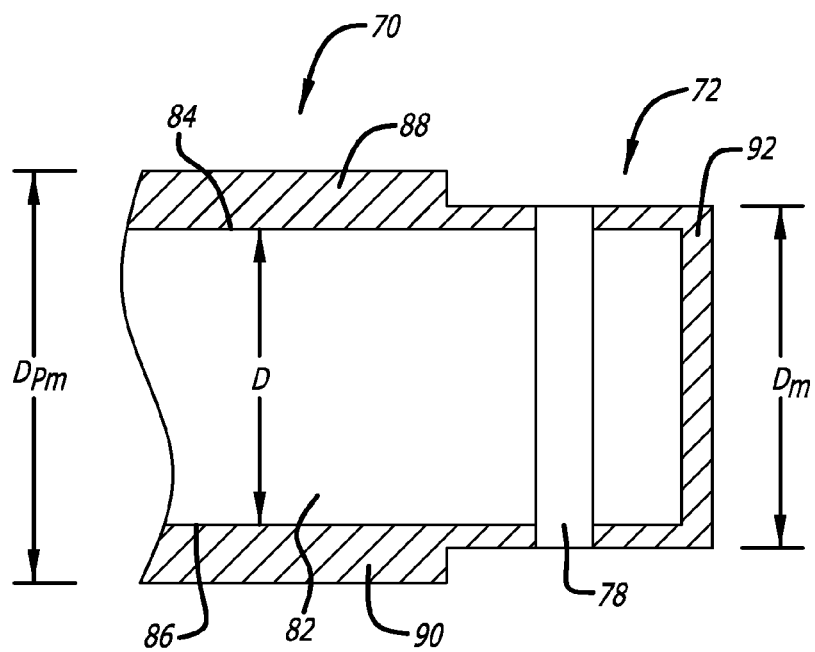
FIG. 2 is a sectional view of the machined composite part shown in FIG. 1 taken in the 2-2 plane.

An exemplary composite part is shown at 70 in FIGS. 1 and 2. The composite part 70 includes a machined end 72 that has been machined to precisely fit into an opening 74 in a mating structural part 76. Holes 78 and 80 have been molded and/or machined into the parts 72 and 76, respectively, to allow insertion of a bolt or other fastener for connecting the parts together. The machined end 72 has been machined to provide a machined dimension $D_M$ that is precisely sized to fit within opening 74, which has a matching height dimension $D_O$. The machined end 72 has been machined back a distance $T_M$ which matches the depth $T_O$ of the opening 74. The machined end 72 also has a width $W_M$ that matches the width $W_O$ of the opening 74.

As shown in FIG. 2, the composite part includes a fibrous structure 82 that is composed of unidirectional (UD) fibers and a resin matrix. UD fibers are generally preferred for use in many structural applications. The fibrous structure 82 has two surfaces 84 and 86 that are separated by a dimension D. Machinable layers 88 and 90 are provided on surfaces 84 and 86, respectively, which run parallel to the direction of the UD fibers in the fibrous structure 82. A machinable surface 92 is provided at the end of the composite part. Machinable surface 92 runs perpendicular to the direction of the UD fibers and is designed to be machined during the assembly process to allow precise changes to be made in $T_M$ to match variation in $T_O$ and to ensure proper alignment of holes 78 and 80 during the assembly process. Composite part 70 is an example of a composite part that has been machined during the manufacturing process to provide a precise dimension $D_M$ and which is also machinable at a later time to alter the dimension $T_M$ to meet variables in dimensions and alignment that may arise after manufacture.

The exemplary part 70 demonstrates the degree of versatility that the present invention provides for machining composite material that is used in structural applications. Not only can the material be machined during and after manufacture, but surfaces of the composite material that are both parallel and perpendicular to the UD fibers can be machined. The opening 74 into which the composite part 70 is inserted is shown as being a precise opening in a single structural part 76. It will be appreciated that the opening 74 could also be defined by two structural parts that are being connected to the composite part 70. As a result, the dimension $D_O$ of opening 74 might vary during assembly operations. In this situation the machining of machinable layers 88 and 90 would be delayed until the precise size of opening 74 is established. Precise size or precise dimension, when used herein, means a size or dimension that is accurate to at least ±0.5 mm and preferably ±0.25 mm.

Figure 3:
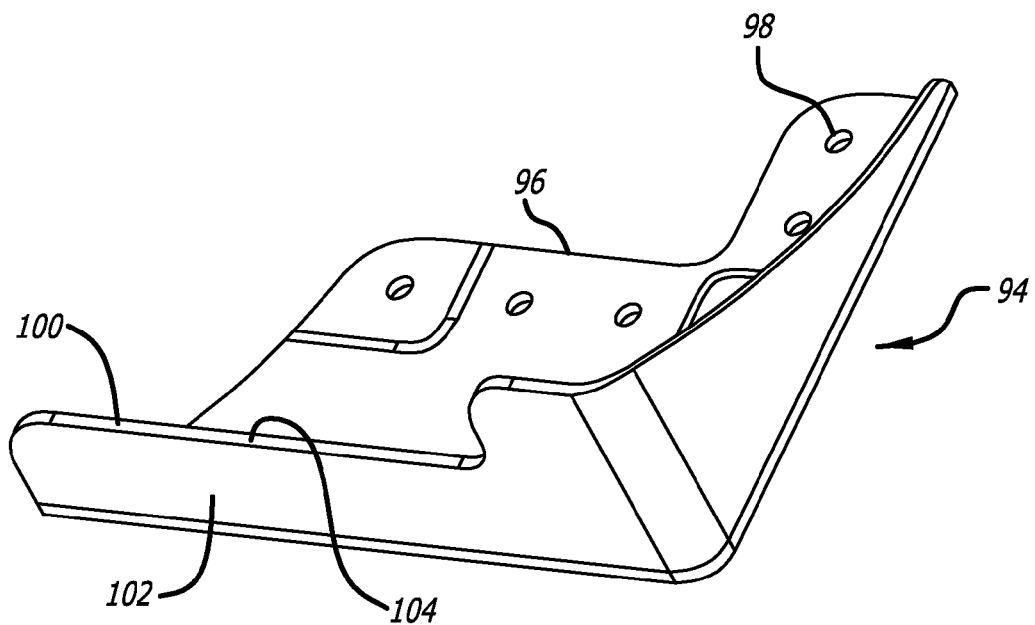
FIG. 3 is a perspective view of an exemplary clip connector which has one side that can be machined in accordance with the present invention.

The exemplary composite material and machined composite parts shown in FIGS. 1-2, 4 and 6 are shown in a simplified and rather generic form in order to demonstrate various aspects of the present invention. In FIG. 3, an exemplary composite aircraft clip that is used to connect primary structural parts of an aircraft together is shown at 94. The clip 94 includes a flange 96 that is designed to be connected to a first primary aircraft structure (not shown) via holes 98. The clip 94 further includes a flange 100 that is designed to be connected to a second primary aircraft structure (not shown). The flange 100 includes machinable surfaces 102 and 104 in accordance with the present invention. The machinable surfaces 102 and 104 are molded together with the fibrous structure that forms the body of the clip. The flange 100 has a cross-section that is represented in FIG. 4.

The various cross-sectional dimensions D, $D_{PM}$ and $D_M$ for flange 100 are determined following the guidelines set forth above. For structural clip connectors like clip 94, it is preferred that D is from 2 mm to 50 mm, $D_{PM}$ is from 4 mm to 70 mm where $t_1$ and $t_2$ are about equal. The fibrous structure is preferably made from UD fibers and a resin matrix where the UD fibers are arranged directionally within the flange 94 as is known in the art to provide maximum structural connection strength. The flange 96 is bolted, riveted or otherwise secured to the first structural part. The appropriate $D_M$, which is required for precise fitting of the clip 94 to the second structural part, is then determined. One or both of the machinable layers 102 and/or 104 are then machined to reduce $D_{PM}$ to $D_M$. In a preferred embodiment, D will be from 3.5 to 5.0 mm and $D_{PM}$ will be from 4.5 to 7.0 mm with $t_1$ and $t_2$ being equal.

A common use for clip 94 is to connect structural frames, stringers or ribs in an airplane to the skin of the fuselage or wing at various locations. The varying contours of the fuselage skin results in variations in the spacing between the stringer and skin at different clip locations. Accordingly, it is necessary to provide clips 94 where the flanges 100 have a range of surface profiles or thicknesses. The use of a machinable layer(s) in accordance with the present invention makes it possible to mold a group of clips 94 that have the same flange geometry ($D_{PM}$) and then machine the flanges to remove varying amounts of the machinable layers to provide a group of clips that have flange geometries ($D_M$) which can vary over a range that is only limited by the thickness of the machinable layer(s). This type of combined molding-machining operation greatly reduces the number of different molds that are required to make the variety of flange geometries ($D_M$) that are required when connecting structural stringers to the fuselage skin. In addition, the clips can be further machined during installation, if necessary, to provide precise fitting of the fuselage skin to the stringer.

The fibrous structure on which the machinable layers are located may be any of the fibrous structures typically used for structural applications and particularly connectors used to connect primary structures of aircraft together. The fibrous structure contains fibers and a resin matrix. The fibers may be made from any material that is suitable for structural applications. Fibers, such as fiberglass, carbon or aramid (aromatic polyamide) fibers are suitable. The fibers are preferably carbon fibers.

The fibers may be cracked (i.e. stretch-broken) or selectively discontinuous fibers, or continuous fibers. The fibers may be woven, non-crimped, non-woven or unidirectional. The woven form of fibers may be selected from a plain, satin, or twill weave style. Such styles and forms are well known in the composite reinforcement field, and are commercially available from a number of companies. The fibers may contain from a few hundred filaments to 12,000 or more filaments. The preferred fiber orientation is unidirectional (UD), which is typically supplied as a tape made up of continuous fiber in a unidirectional orientation.

The resin matrix may be composed of any of the thermoset and/or thermoplastic resins that are typically used for structural applications. Preferably, the amount of uncured resin matrix will be between 25 to 40 weight percent of the composite material. The resin matrix may be any of the epoxy resins, bismaleimide resins, polyimide resins, polyester resins, vinylester resins, cyanate ester resins, phenolic resins or thermoplastic resins that are used in structural composite materials. Exemplary thermoplastic resins include polyphenylene sulfide (PPS), polysulfone (PS), polyetheretherketone (PEEK), polyetherketoneketone (PEKK), polyethersulfone (PES), polyetherimide (PEI), polyamide-imide (PAI). Epoxy resins that are toughened with a thermoplastic, such as PES, PEI and/or PAI, are preferred resin matrices. Resins that are typically present in UD tape of the type used in the aerospace industry are preferred. Exemplary thermoplastic toughened resins that are suitable for use as the resin matrix are described in U.S. patent application Ser. Nos. 11/787,700; 11/787,701; and 12/764,636.

Unidirectional (UD) tape is the preferred type of prepreg that is used to form the fibrous structure. Unidirectional tape is available from commercial sources or it may be fabricated using known prepreg formation processes. The dimensions of the UD tape may be varied widely depending upon the particular composite part being made. For example, the width of the UD tape (the dimension perpendicular to the UD fibers) may range from 0.5 inch to a foot or more. The tape will typically be from 0.004 to 0.012 inch (0.01 to 0.03 cm) thick and the length of the UD tape (the dimension parallel to the UD fibers) may vary from 0.5 inch (1.3 cm) up to a few feet (one meter) or more depending upon the size of the part and the particular orientation of each piece of UD tape within the part.

A preferred exemplary commercially available unidirectional prepreg is HexPly® 8552, which is available from Hexcel Corporation (Dublin, Calif.). HexPly®8552 is available in a variety unidirectional tape configurations that contain an amine cured toughened epoxy resin matrix in amounts ranging from 34 to 38 weight percent and carbon or glass UD fibers having from 3,000 to 12,000 filaments. The fibers typically account for 60 volume percent of the UD tape. The preferred UD fibers are carbon fibers.

The fibrous structure is first formed as an uncured structure, which is combined with the desired uncured machinable layers and then molded to provide a final cured composite material that includes the machinable layers and fibrous structure as a single molded composite material. Exemplary procedures for using UD tape to fabricate clips and other structural connectors or parts that have relatively complex shapes are described in U.S. patent application Ser. No. 12/561,492.

In accordance with the present invention, the machinable layers are composed of random discontinuous fiber composite (DFC) that can be cured under the same process conditions as the structural fibrous material used for the part. Quasi-isotropic chopped prepreg is a form of DFC that is available commercially form Hexcel Corporation (Dublin, Calif.) under the trade name HexMC®. HexMC® has been used for a variety of purposes including aerospace articles as described in U.S. patent application Ser. No. 11/476,965 and as a material for making high-strength molds as described in U.S. Pat. No. 7,510,390.

Quasi-isotropic (Q-I) prepreg is composed of segments or "chips" of unidirectional fiber tape and a resin matrix. Q-I prepreg is typically supplied as a mat made up of randomly oriented chips of chopped unidirectional tape prepreg. The size of the chips may be varied as well as the type of fibers depending upon the size of the machinable layer(s) and how precise the machining will be. It is preferred that the chips be ⅓ inch wide, 2 inches long and 0.006 inch thick. The chips include unidirectional fibers that can be carbon, glass, aramid, polyethylene or any of the fibers types that are commonly used in the aerospace industry. Carbon fibers are preferred. The chips are randomly oriented in the mat and they lay relatively flat. This provides the mat with its transverse isotropic properties.

The UD tape prepreg that is chopped to form the chips or segments includes a resin matrix that can be any of the resins commonly used in aerospace prepregs including epoxy, phenolic, bismaleimide and cyanates. Epoxy resins of the type used in the fibrous structure are preferred. Thermosetting resins that are toughened with thermoplastics are preferred because they tend to be more resistant to fracturing or delamination when the machinable surface is machined. The resin content of the chips may also be varied between 25 and 45 weight percent of the total prepreg weight. Chips with resin contents of between 35 and 40 weight percent are preferred. No additional resin is typically added to the prepreg chips when forming the quasi-isotropic chopped prepreg. The resin present in the initial prepreg is sufficient to bond the chips together to form the mat.

The quasi-isotropic chopped prepreg can be made by purchasing or making unidirectional prepreg tape or tow of desired width. The tape or tow is then chopped into chips of desired length and the chips are laid flat and pressed together to form a mat of randomly oriented chips. The chips inherently bond together due to the presence of the prepreg resin. The preferred method, however, is to purchase HexMC® or equivalent commercially available quasi-isotropic chopped prepregs.

An exemplary preferred quasi-isotropic chopped prepreg material is HexMC® 8552/AS4. This quasi-isotropic chopped prepreg material is supplied as a continuous roll of a mat that is 46 cm wide and 0.20 cm thick. HexPly® 8552/AS4 unidirectional fiber prepreg is used to make the chips that are randomly oriented in the quasi-isotropic mat. HexPly® 8552/AS4 prepreg is a carbon fiber/epoxy unidirectional tape that is 0.016 cm thick and has a fiber areal weight of about 145 grams/square meter. The resin content of the tape is 38 weight percent with the resin (8552) being a thermoplastic-toughened epoxy. The tape is slit to provide 0.85 cm strips and chopped to provide chips that are 5 cm long. The chip density is about 1.52 gram/cubic centimeter. Other exemplary quasi-isotropic chopped prepreg can be made using other HexPly® unidirectional prepreg tape, such as EMC 116/AS4 (epoxy/carbon fiber), 8552/IM7 (thermoplastic-toughened epoxy/carbon fiber), 3501-6/T650 (epoxy/carbon fiber) and M21/IM7 (thermoplastic-toughened epoxy/carbon fiber). HexMC® 8552/AS4 and M21/IM7 are preferred quasi-isotropic chopped prepregs for use in forming machinable layers in accordance with the present invention.

It is preferred that the quasi-isotropic chopped prepreg be applied to the surface of the fibrous structure to form the desired machinable surface before either component is cured. The resulting uncured composite material is then cured/molded using conventional molding procedures to form the cured composite material. The cured machinable layer is then machined, as described above, to provide the final composite part. It is preferred that the matrix resin and fibers used in the fibrous support and machinable layer be the same. However, different resins and/or fibers may be used in the fibrous support and machinable layer, if desired, provided that the resins and/or fibers are compatible and do not result in delamination or other adverse reaction during curing or subsequent machining.

Any suitable curing/molding procedure may be used to cure/mold the uncured composite material. It is preferred that the fibrous structure and machinable layer be co-cured by compression molding using a multi-step process that includes staging of the uncured composite material to enable molding at isothermal conditions. Un-staged alternatives are available and may be used with ramped press cycles or autoclave molding. However, it is preferred that the uncured composite material be staged prior to curing. Staging is an open-air oven process that generally transforms the machinable layer and fibrous structure from a flexible material to a stiff solid state. Staging for 10 to 20 minutes at 160° C. to 177° C. is preferred. Staging times and temperatures are dependent on the size of the part being molded, the amount of flow desired, the amount of loading time desired and the final cure temperature. Once staged the material is allowed to cool and can be stored in a freezer for later processing.

Final cure time is a function of the isothermal cure temperature and is also dependent upon the size of the composite material being molded and the particular resin matrix. The final cure time can be as little as 10 minutes for composite materials that are 3 mm thick or less. As a general rule, 5 minutes of cure time is added for every 1.5 mm increase in part thickness above 3 mm with the minimum curing conditions being set at 10 minutes and 204° C. for parts that are 3 mm thick or less. Lower isothermal cure temperatures may be used to facilitate part loading or to allow more time to equalize the charge temperature in thick parts before pressing. If staging is not desired, it is possible to lay up in the mold and perform a traditional ramp and dwell cure on the part. However, staging is preferred in order to limit flow of resin during the molding process.

The machinable layer(s) and fibrous structure are preferably molded to form the cured composite material at pressures in the range of 500-2000 psi using matched metal or composite molds with shear edges (0.015 inch or less). The isothermal mold temperature may range from 177° C. to 204° C. with cure times generally ranging for 10 to 45 minutes. High pressure molding is typically useful for making parts with complex shapes. For parts that do not have complex shapes, other molding processes may be used, if desired.

Molding of the uncured composite material to form the cured composite material using conventional vacuum bagging techniques is also suitable. For example, the uncured composite material may be envelope bagged and subjected to a traditional autoclave cycle using 100 psi and full vacuum and increasing the temperature at 1.7° C. per minute to 177° C. and then post curing the composite material at 177° C. for 2 hours.

Once the composite material is cured/molded into the desired shape, the machinable surface(s) is then machined in accordance with any of the known machining processes to remove a sufficient amount of the machinable layer to go from $D_{PM}$ to $D_M$ over the surface of the part that requires machining. The machining of the machinable surfaces can be accomplished using any of the known machining tools and techniques that are commonly used in machining steel. Such machining tools typically employ carbide and diamond coated numerical controlled (N/C) cutters. Typical surface tolerances on the order of ±0.1 mm or less can be achieved when the machinable layer in accordance with the present invention is machined using standard machining tools. If desired, fine sanding materials or other abrasive polishing materials may be used, as is known in the art, to make final precise changes to the machined surface.

Figure 7:
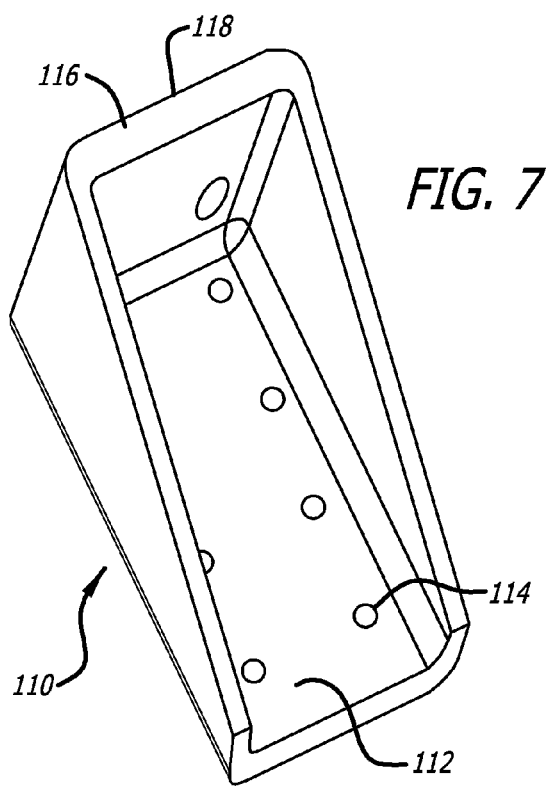
FIG. 7 is a perspective view of an exemplary aircraft gusset that has been molded and machined in accordance with the present invention.

An exemplary gusset that is used to connect structural parts of an aircraft together is show in FIG. 7 at 110. The gusset 110 includes a base portion 112 that is fastened to the aircraft structure via holes 114 and a flange portion 116 that is fastened to another aircraft structural part. The flange portion 116 includes a machinable layer 118 in accordance with the present invention. The machinable layer 118 may be up to 20 mm thick. A single mold may be used to form multiple gussets 110 where the flange portion has the same thickness. A group of gussets with different flange thicknesses can then be made from the multiple molded gussets where the thickness of the flange portions can be varied by up to 20 mm to meet variations in assembly geometries. For a typical gusset, the overall thickness of the molded flange portion 116 ($D_{PM}$) will be between 5 and 15 mm with the machinable layer being between 1 and 5 mm thick.

Figure 8:
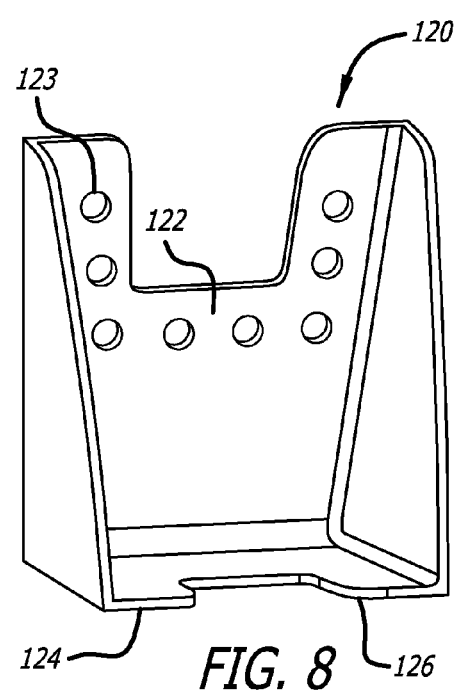
FIG. 8 is a perspective view of an exemplary aircraft cleat that has been molded and machined in accordance with the present invention.

An exemplary aircraft cleat is shown at 120 in FIG. 8. The cleat 120 includes a base portion 122 that is fastened to an aircraft structure via holes 123. The cleat 120 further includes flange 124 that is connected to a second aircraft structure. The flange 124 includes a machinable layer 126 in accordance with the present invention. The machinable layer 126 is typically up to 5 mm thick with the underlying fibrous structure being from 3 to 20 mm thick. The machinable layer may be machined during the fabrication process to produce a group of cleats having a range of surface profiles or thicknesses and/or it can be machined on an individual basis during assembly operations to ensure precise fitting of the cleat base and flange to their respective aircraft structures.

Figure 9:
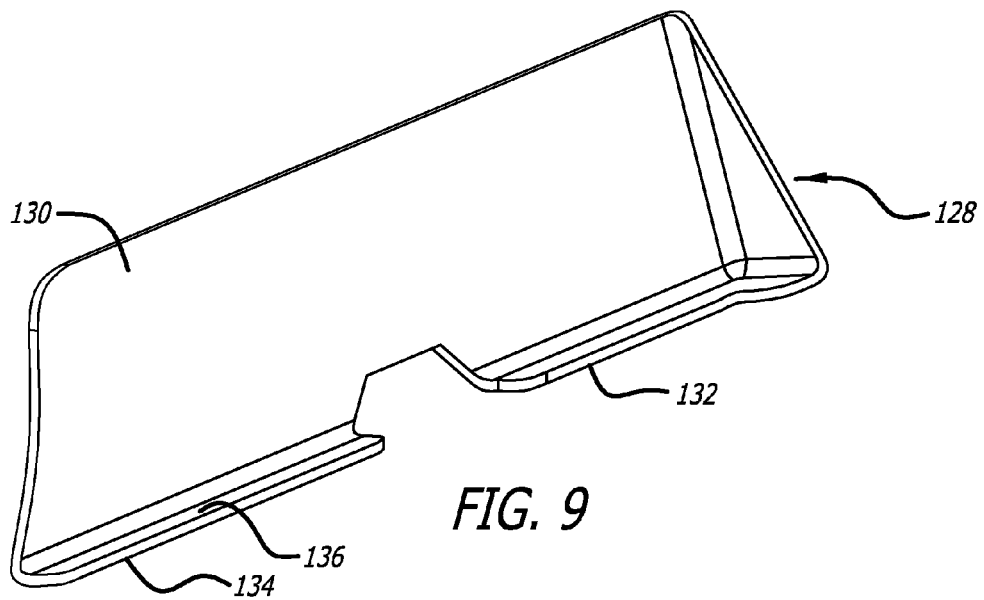
FIG. 9 is a perspective view of an exemplary aircraft shear tie that has been molded and machined in accordance with the present invention.

An exemplary aircraft shear tie is shown at 128 in FIG. 9. The shear tie 128 includes a base portion 130 and a flange portion 132 for connecting two structural parts of an aircraft together. The flange portion 132 includes machinable layers 134 and 136 in accordance with the present invention. Different amounts of the machinable layers 134 and 136 can be removed at different locations along the flange portion 132 in order to provide a flange that varies in thickness and/or profile to precisely mate with an aircraft structure. The amount of machinable layer that is removed may vary from 0 to 100 percent of the thickness of the machinable layer in order to follow the contour of the aircraft structure to which the flange is mated.

Figure 10:
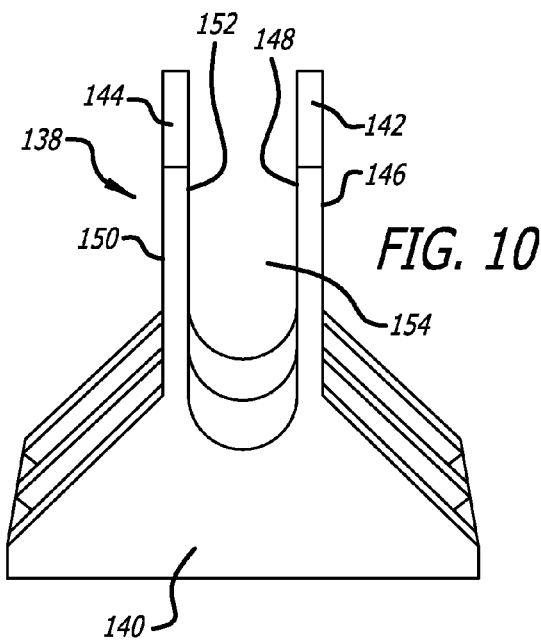
FIG. 10 is a perspective view of an exemplary aircraft bracket that has been molded and machined in accordance with the present invention.

An exemplary aircraft bracket is shown at 138 in FIG. 10. The bracket 138 includes a base portion 140 and two flange portions 142 and 144. The bracket base 140 is fastened to one aircraft structure and a second aircraft structure is fastened to flanges 140 and 142. The second aircraft structure may be inserted between and/or around the flanges. When the second aircraft structure is to be inserted in the space 154 between the flanges, the flanges include machinable surfaces 148 and 152. When the second aircraft structure is designed to be inserted between and around the flanges, then the flanges will include machinable surfaces 146, 148, 150 and 152. The use of four machinable surfaces provides a relatively large range of available machinable dimensions ($D_M$). When the bracket 138 includes four machinable surfaces, the bracket cross-sectional structure is similar to the generic part shown in FIG. 6, except that machinable surfaces would also be located on the exterior surfaces 57 and 59 of the part 52.

Figure 11:
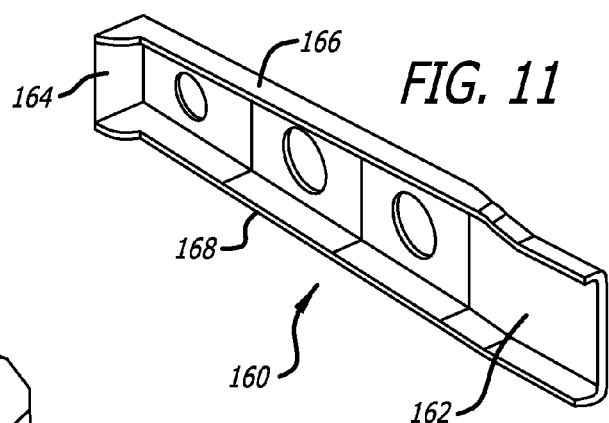
FIG. 11 is a perspective view of an exemplary aircraft intercostals that has been molded and machined in accordance with the present invention.

An exemplary intercostal for connecting two structures of an aircraft together is shown at 160 in FIG. 11. The intercostal 160 includes a base portion 162 and flange portions 164, 166 and 168. Flange 164 may include a machinable layer in accordance with the present invention on one or both sides. In addition, the flanges 166 and 168 may include machinable layers on one or both sides.

Figure 12:
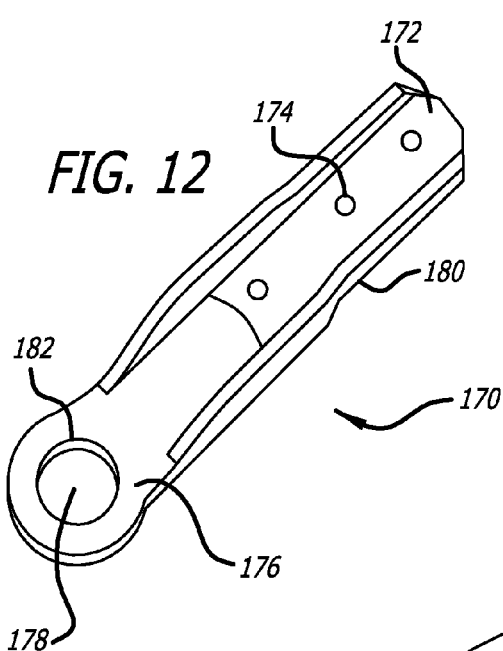
FIG. 12 is a perspective view of an exemplary aircraft link or lug that has been molded and machined in accordance with the present invention.

An exemplary aircraft link or lug is shown in FIG. 12 at 170. The link 170 includes a base portion 172 that includes holes 174 for attaching the link to an aircraft structure. The link 170 also includes an end portion 176 that includes a hole 178 for connecting to a pin or other rod-shaped connector or aircraft structure. The bottom side 180 of the link may include a machinable layer in accordance with the present invention to allow machining of the base to provide a surface that precisely matches the aircraft structure to which it is connected. In addition, the circular surface 182 that defines hole 178 may also include a machinable surface to allow a group of links to be made from a single mold where the diameter of hole 178 is varied within the limits of the machinable layer thickness. The machinable layer on circular surface 182 is perpendicular to the UD fibers that are typically used to form the base portion of the link. Such UD fibers are susceptible to delamination and fraying when a hole is machined directly into the UD fibrous body. The molding of a machinable layer as surface 182 eliminates these problems and also provides the added benefit of being able to machine the opening 178 to a range of precise dimensions.

Figure 13:
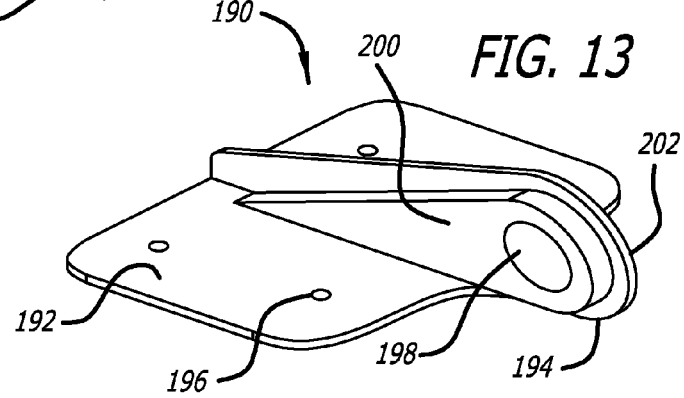
FIG. 13 is a perspective view of an exemplary aircraft fitting that has been molded and machined in accordance with the present invention.

An exemplary aircraft fitting is shown at 190 in FIG. 13. The fitting 190 includes a base plate 192 and flange portion 194. The base plate 192 includes holes 196 for attaching the plate to an aircraft structure. The flange 194 includes a hole 198 for connecting a pin or other rod-shaped connector or aircraft structure. The hole 198 may be lined with a machinable layer in the same manner as the hole 178 in link 170. In addition, the surfaces 200 and 202 may include a machinable layer in accordance with the present invention. Machining of surfaces 200 and 202 may be required when flange 194 must fit precisely within an opening in the aircraft structure.

A number of composite panels were formed entirely from HexMC® 8552/AS4 discontinuous fiber composite prepreg. The panels were molded in accordance with conventional molding techniques to provide panels in which the fibrous support and machinable layer were composed of the same material. Prior to machining, the panels had the same cross-section as shown in FIG. 4 with $D_{PM}$'s ranging from 4.2 to 6.2 mm. The molded panels that were thicker than 4.2 mm were machined to varying degrees so that all of the machined panels had a $D_M$ of 4.2 mm. Some of the panels were machined on only one side and some were machined on both sides. Test coupons were cut from each panel and used for conducting mechanical tests including tension, compression and short beam shear in accordance with ASTM D3039, ASTM D6484 and EN 2563, respectively. In all cases, machining of the panels did not have an adverse effect on the measured properties when compared to panels that had not been machined.

Figure 14:
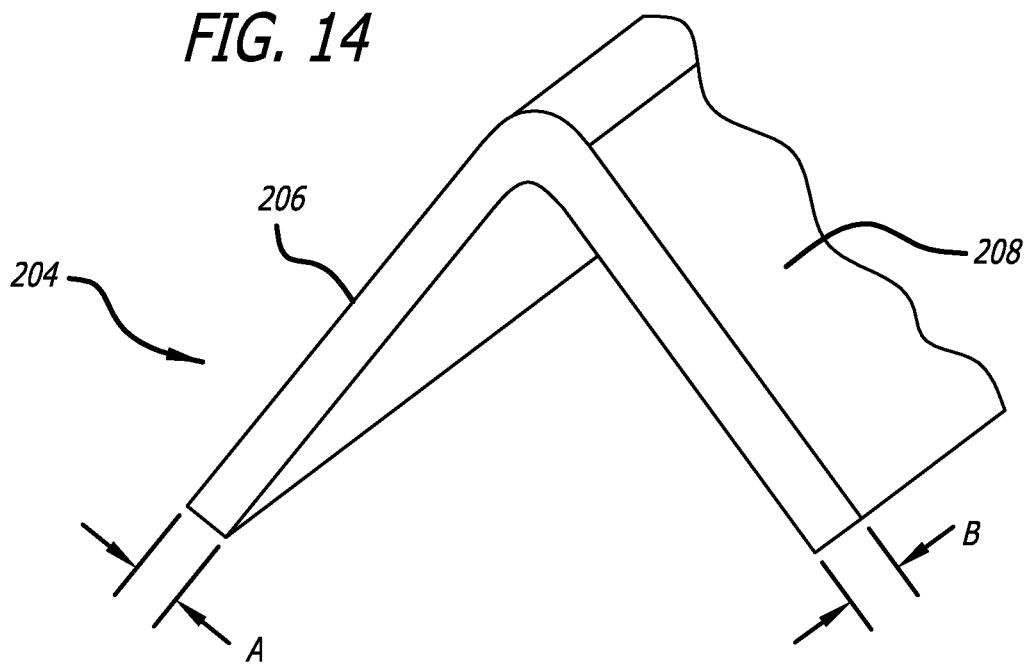
FIG. 14 is a partial perspective view of an exemplary angle part, prior to machining in accordance with the present invention, wherein the fibrous structure and machinable layer are made from the same material.
Figure 15:
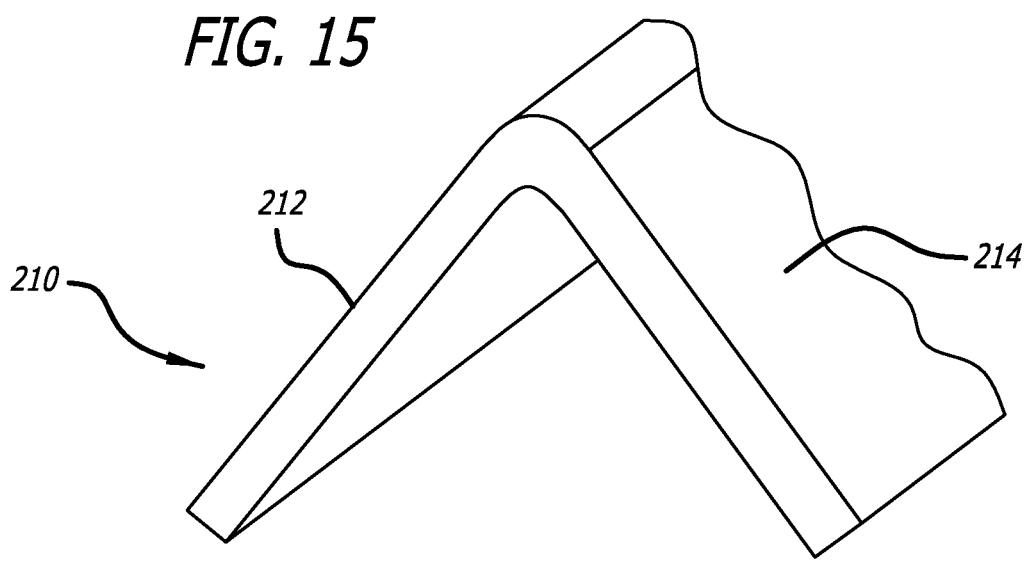
FIG. 15 is a partial perspective view of an exemplary angle part after machining in accordance with the present invention, wherein the fibrous structure and machinable layer are made from the same material.

An angle part is shown at 204 in FIG. 14. The angle part 204 includes portions 206 and 208 that have thicknesses A and B, respectively. A number of angle parts 204 were also molded with HexMC® 8552/AS4 discontinuous fiber composite prepreg. A group of the angle parts were molded to provide reference angle parts where both A and B were equal to 4.2 mm. Another group of the angle parts were molded to provide parts for machining where A was equal to 4.2 mm and B was equal to 4.7 mm. These parts were machined to reduce the thickness of portion 208 to provide machined angle parts 210 as shown in FIG. 15 where portions 212 and 214 both had thicknesses of 4.2 mm. Test coupons were cut from the reference parts and the machined parts. The coupons were used for conducting interlaminar shear tests in accordance with ASTM D6415. In all cases, machining of the angle parts did not have an adverse effect on the measured properties when compared to the reference net molded angle parts.

Reference parts similar to the clip connector 94 shown in FIG. 3 were compression molded using HexMC® 8552/AS4 DFC prepreg or HexPly® 8552 unidirectional fiber prepreg. The reference clip connectors were molded to a uniform thickness of 1.8 mm. Clip connectors for machining were also compression molded using HexMC® 8552/AS4 DFC prepreg alone or a combination of HexMC® 8552/AS4 DFC prepreg and HexPly® 8552 unidirectional fiber prepreg. These machinable clip connectors were the same as the reference clip connectors except that side 100 of the machinable clip connector was molded to be 2.3 mm thick. The extra 0.5 mm thickness was composed of HexMC® 8552/AS4 DFC prepreg. This provided two types of machinable clip connectors. One where the 2.3 mm thick side was composed entirely of molded HexMC® 8552/AS4 DFC prepreg and the other where the 2.3 mm thick side was composed of a 1.8 mm thick layer of molded HexPly® 8552 unidirectional fiber prepreg and a 0.5 mm thick layer of molded HexMC® 8552 DFC prepreg, which was located on side 102 of the connector.

The machinable clip connectors were machined on surface 102 to reduce the thickness of side 100 to 1.8 mm. In no event were the clip connectors machined so as to penetrate into the layer of molded HexPly® 8552 unidirectional fiber prepreg. The reference and machined clip connectors were mechanically fastened to two parts representing a typical curved aircraft fuselage skin and frame assembly. The clip connectors were then subjected to tension and shear loading which are two of the critical load factors for this type of primary aircraft structure connections. The machined clip connectors were found to perform better than the reference net molded clip connectors in both tension and shear loading. This unexpected increase in performance of the machined clip connectors is believed to be caused, at least in part, by the better fit between the parts that is obtained by machining. In accordance with the present invention, the molded clip connector can be precisely machined to match the geometry of the other parts to a tighter tolerance and thereby reduce the amount of pre-stressing that may occur when molded clip connectors are used without any machining.

As is apparent from the preceding example, machining of molded composite parts in accordance with the present invention provides the added benefit of strengthening the joint between the parts being connected together. In addition, the inclusion of a machinable layer of HexMC® 8552/AS4 DFC prepreg on the surface of a UD fibrous body was found to provide the unexpected added benefit of increasing the damage tolerance of the UD fibrous body.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. An aircraft which includes primary aircraft structures, said aircraft comprising:
   a first part, comprising a fibrous structure comprising unidirectional fibers and a cured resin matrix, said fibrous structure having at least one surface and a layer that is located on said surface, said layer comprising a cured quasi-isotropic prepreg, said layer having been machined to provide a machined surface; and
   a primary aircraft structure that is attached to said first part, said primary aircraft structure comprising at least one surface that fits against said machined surface on said first part.

2. An aircraft according to claim 1 wherein said first part and said primary aircraft structure second part are attached together with a fastener.

3. An aircraft according to claim 1 wherein said first part comprises a second surface and a second layer that is located on said second surface, said second layer comprising a cured quasi-isotropic prepreg, said second layer having been machined to provide a second machined surface and wherein said primary aircraft structure comprises a second surface that fits against said second machined surface on said first part.

4. An aircraft according to claim 3 wherein said first part and said primary aircraft structure are attached together with a fastener.

5. An aircraft according to claim 3 wherein said first part comprises a third surface and a third layer that is located on said third surface, said third layer comprising a cured quasi-isotropic prepreg, said third layer being machined to provide a third machined surface and wherein said primary aircraft structure comprises a third surface that fits against said third machined surface on said first part.

6. An aircraft according to claim 5 wherein said first part and said primary aircraft structure are attached together with a fastener.

7. An aircraft according to claim 3 wherein said first and second surfaces are located on said primary structure so as to define an opening in which said first part is located to thereby provide said fitting of said first machined surface against said first surface of said primary aircraft structure and to provide said fitting of said second machined surface against said second surface of said primary aircraft structure.

8. An aircraft according to claim 7 wherein a third surface is located on said primary aircraft structure so as to define an end to said opening in which said first part is located, said first part comprising a third surface and a third layer that is located on said third surface of the first part, said third layer comprising a cured quasi-isotropic prepreg, said third layer having been machined to provide a third machined surface that fits against said third surface of said primary aircraft structure.

9. An aircraft according to claim 3 wherein said first and second machined surfaces are located on said first part so as to define an opening in which said primary aircraft structure is located to thereby provide said fitting of said first machined surface against said first surface of said primary aircraft structure and to provide said fitting of said second machined surface against said second surface of said primary aircraft structure.

10. An aircraft according to claim 9 wherein said first part comprises a third surface and a third layer that is located on said third surface of the first part, said third layer comprising a cured quasi-isotropic prepreg, said third layer having been machined to provide a third machined surface that is located on said first part so as to define an end to said opening in which said primary aircraft structure is located, said primary aircraft structure comprising a third surface that fits against said third machined surface.

11. An aircraft according to claim 7 wherein said first part and said primary structure are attached together with a fastener.

12. An aircraft according to claim 9 wherein said first, part and said primary aircraft structure are attached together with a fastener.

* * * * *